(12) United States Patent
Phacharintanakul et al.

(10) Patent No.: US 12,323,416 B2
(45) Date of Patent: Jun. 3, 2025

(54) USING A USER LOCATION AS AN ADDITIONAL SECURITY FACTOR FOR ONLINE SERVICES

(71) Applicant: International Business Machines Corporation, Armonk, NY (US)

(72) Inventors: Kaweepoj Phacharintanakul, Warwick (GB); Wolfgang von Drews, Crailsheim (DE); Gwilym Benjamin Lee Newton, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 18/334,556

(22) Filed: Jun. 14, 2023

(65) Prior Publication Data
US 2024/0422155 A1    Dec. 19, 2024

(51) Int. Cl.
*H04L 9/40* (2022.01)
*H04W 4/021* (2018.01)

(52) U.S. Cl.
CPC ...... *H04L 63/0838* (2013.01); *H04L 63/0442* (2013.01); *H04W 4/021* (2013.01)

(58) Field of Classification Search
CPC ............. H04L 63/0838; H04L 63/0442; H04L 63/107; H04W 4/021
See application file for complete search history.

(56) References Cited

U.S. PATENT DOCUMENTS

| 6,292,665 | B1 | 9/2001 | Hildebrand | |
|---|---|---|---|---|
| 8,090,351 | B2 | 1/2012 | Klein | |
| 10,278,114 | B2 | 4/2019 | Hillary | |
| 11,115,213 | B1* | 9/2021 | Marimuthu | ............. G06F 21/42 |
| 2003/0204726 | A1* | 10/2003 | Kefford | ................. H04L 9/3271 |
| | | | | 713/171 |
| 2014/0079219 | A1* | 3/2014 | Yigit | ................... H04W 12/033 |
| | | | | 380/270 |
| 2019/0139024 | A1 | 5/2019 | Bakshi | |
| 2019/0378135 | A1 | 12/2019 | Lloyd | |
| 2020/0106758 | A1 | 4/2020 | Moran | |

FOREIGN PATENT DOCUMENTS

KR    102004703 B1    10/2019
TW       537764 B      6/2016

\* cited by examiner

*Primary Examiner* — Henry Tsang
(74) *Attorney, Agent, or Firm* — Kelsey Skodje

(57) ABSTRACT

A computer-implemented method, a computer program product, and a computer system for using a user location as a security factor for online services. Upon receiving from a computing device of a user a request for a digital service allowed in a geofence, a first computer hosting a digital service provider generates an original one-time password (OTP) and sends the original OTP to a second computer hosting a communication service provider. The second computer encrypts the original OTP using a private key for a mobile network cell communicating with a mobile device of the user and sends an encrypted OTP to the mobile device. Upon receiving the encrypted OTP from the computing device, the first computer decrypts the encrypted OTP, using public keys for one or more cells covering the geofence. Upon determining a decrypted OTP matches the original OTP, the first computer allows the digital service to be provided.

20 Claims, 7 Drawing Sheets

USING A USER LOCATION AS AN ADDITIONAL SECURITY FACTOR FOR ONLINE SERVICES

BACKGROUND

The present invention relates generally to security for online services, and more particularly to using a user location as an additional security factor for online services.

Location services have existed to enable geographical locations of users based various methods, such as IP look-up or identification of Wi-Fi access points from which users access the internet. Mobile communication networks include a high number of cell base sites scattered across a geographical area being served. Each cell site includes wireless antennae which are located in the geographical area regularly and communicate with end-user mobile devices. The existing mechanism handles cell site handover when the end-user devices move from a geographical area covered by a cell site to an adjacent geographical area covered by another cell site.

Information regarding an ID of a primary cell site which is communicating with a mobile device can be used to identify where the mobile device is currently located. The identification the location of the mobile device is based on the exact coordinates or an address of the primary cell base site as maintained by a mobile communication service provider (CSP).

SUMMARY

In one aspect, a computer-implemented method for using a user location as a security factor for online services is provided. The computer-implemented method includes receiving from a computing device of a user, by a first computer hosting a digital service provider, a request for a digital service allowed in a geofence. The computer-implemented method further includes generating, by the first computer, an original one-time password for the digital service. The computer-implemented method further includes sending to a second computer hosting a communication service provider, by the first computer, the original one-time password, where the second computer encrypts the original one-time password using a private key of a public-private key pair for a cell in a mobile network of the communication service provider and the cell is communicating with a mobile device of the user, and where the second computer sends an encrypted one-time password to the mobile device. The computer-implemented method further includes receiving, by the first computer, the encrypted one-time password entered by the user on the computing device of the user. The computer-implemented method further includes decrypting, by the first computer, the encrypted one-time password to obtain one or more decrypted one-time passwords, using respective public keys of public-private key pairs for one or more cells covering the geofence. The computer-implemented method further includes determining, by the first computer, whether at least one of the one or more decrypted one-time passwords matches the original one-time password. The computer-implemented method further includes, in response to determining at least one of the one or more decrypted one-time passwords matching the original one-time password, allowing, by the first computer, the digital service to be provided.

In another aspect, a computer program product for using a user location as a security factor for online services is provided. The computer program product comprises a computer readable storage medium having program instructions embodied therewith, and the program instructions are executable by one or more processors. The program instructions are executable to: receive from a computing device of a user, by a first computer hosting a digital service provider, a request for a digital service allowed in a geofence; generate, by the first computer, an original one-time password for the digital service; send to a second computer hosting a communication service provider, by the first computer, the original one-time password, where the second computer encrypts the original one-time password using a private key of a public-private key pair for a cell in a mobile network of the communication service provider and the cell is communicating with a mobile device of the user, and where the second computer sends an encrypted one-time password to the mobile device; receive, by the first computer, the encrypted one-time password entered by the user on the computing device of the user; decrypt, by the first computer, the encrypted one-time password to obtain one or more decrypted one-time passwords, using respective public keys of public-private key pairs for one or more cells covering the geofence; determine, by the first computer, whether at least one of the one or more decrypted one-time passwords matches the original one-time password; and in response to determining at least one of the one or more decrypted one-time passwords matching the original one-time password, allow, by the first computer, the digital service to be provided.

In yet another aspect, a computer system for using a user location as a security factor for online services is provided. The computer system comprises one or more processors, one or more computer readable tangible storage devices, and program instructions stored on at least one of the one or more computer readable tangible storage devices for execution by at least one of the one or more processors. The program instructions are executable to receive from a computing device of a user, by a first computer hosting a digital service provider, a request for a digital service allowed in a geofence. The program instructions are further executable to generate, by the first computer, an original one-time password for the digital service. The program instructions are further executable to send to a second computer hosting a communication service provider, by the first computer, the original one-time password, where the second computer encrypts the original one-time password using a private key of a public-private key pair for a cell in a mobile network of the communication service provider and the cell is communicating with a mobile device of the user, and wherein the second computer sends an encrypted one-time password to the mobile device. The program instructions are further executable to receive, by the first computer, the encrypted one-time password entered by the user on the computing device of the user. The program instructions are further executable to decrypt, by the first computer, the encrypted one-time password to obtain one or more decrypted one-time passwords, using respective public keys of public-private key pairs for one or more cells covering the geofence. The program instructions are further executable to determine, by the first computer, whether at least one of the one or more decrypted one-time passwords matches the original one-time password. The program instructions are further executable to, in response to determining at least one of the one or more decrypted one-time passwords matching the original one-time password, allow, by the first computer, the digital service to be provided.

DETAILED DESCRIPTION

Figure 1:
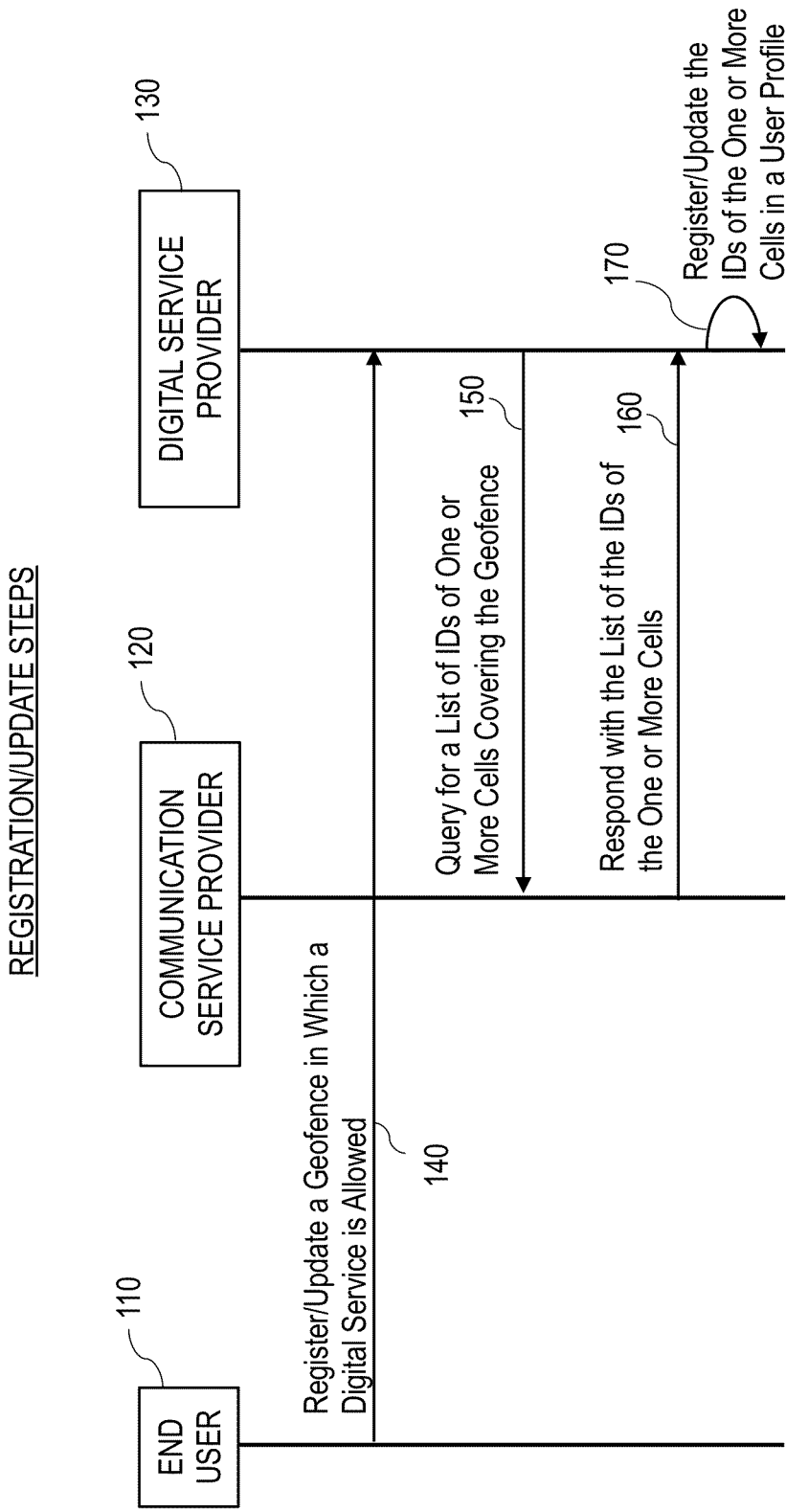
FIG. 1 shows a registration/update process for using a user location as an additional security factor for online services, in accordance with one embodiment of the present invention.

Embodiments of the present invention disclose a method of verifying user physical location anchoring to cell site locations of a physical mobile network. A primary use case is to introduce an additional security factor to secure an application, such as online banking or a government online citizen service which is restricted to be used only from some pre-defined ring-fenced geographical areas at certain point in time. The aim of the present invention is to introduce an additional security factor as "where you are" in addition to "what you know" (password) and "what you have" (mobile phone one-time password). The present invention can also be applied to restrict online services (e.g., a streaming service) to users located in certain areas. The present invention can be applied to verify locations of end users for other purposes, such as verifying locations of end users consuming digital services (e.g., social media services) for taxation of the digital services according to the locations of end users.

In embodiments of the present invention, a user's location is verified through a communication service provider (for example, a mobile communications company). The communication service provider encodes a one-time password that is sent from a digital service provider (for example, a bank, a government authority, a digital streaming service provider, or a social media service provider) to a user using key pair unique to a primary cell site with which a user's mobile device is communicating. Through the benefits of the present invention, the digital service provider will not know the exact location of the user but merely know whether the user is physically located within the permissive location zone allowed to utilize a service provided by the digital service provider. The communication service provider as a mobile network operator knows a physical location to the granularity corresponding to the coverage area of a single cell site; however, the communication service provider does not know the content provided or to be provided by the digital service provider. This is a separation of knowledge where neither the digital service provider nor the communication service provider has the complete knowledge of both the physical location and the digital traffic of the service.

In embodiments of the present invention, the mobile network is not necessarily used for the digital traffic of the service. The mobile network serves merely as a vector to proof a location where the service is consumed. The digital traffic of the service may go through another network totally separate from the mobile network provided by the communication service provider, such as home broadband or Wi-Fi.

The present invention has advantages over existing geolocation services based on the IP address or the Wi-Fi SSID (Service Set Identifier) which cannot be proven robust against IP masquerading. The present invention relies merely on basic mobile network architecture with no modification on the end subscriber's part. The user may just use a simple mobile phone handset with text messaging (Short Messaging Service) feature. There is no change required in the edge location (cell site) in order to use the present invention.

The advantages of the present invention over known approaches are as follows. (1) Compared to detecting the public IP from where the users communicate with the digital service provider, the disclosed method in the invention is robust against IP address masquerading. (2) A geolocation approach in a web browser typically relies on a public IP and hence the present invention is robust against IP masquerading. (3) The present invention preserves data privacy and does not require user's consent beyond what is already happening in the course of today's service scheme. An actual location of a mobile phone user is already known by the communication service provider and will not be shared with the digital service provider. The digital service provider never needs to know where the user's location is, and its knowledge is restricted to whether the user is in a predefined or preregistered geolocation agreed by the user and the digital service provider to carry out the service (e.g., a secured transaction at the bank). (4) The present invention is proof against location spoofing. The private-public key pair is chosen by a computer system of the communication service provider, using the identity of the genuine cell site ID of the communication service provider. (5) The present invention does not need a smart phone to work. A feature phone capable of text messaging is sufficient. (6) In the present invention, computation is done in the backend of the communication service provider and the digital service provider. The present invention does not require any additional resources on the user's mobile device or the user's computing device.

FIG. 1 shows a registration/update process for using a user location as an additional security factor for online services, in accordance with one embodiment of the present invention. The registration/update process involves end user 110, communication service provider 120, and digital service provider 130. End user 110 uses a service provided by digital service provider 130, and digital service provider 130 needs to verify a location of end user 110 prior to providing the service. In an example where digital service provider 130 is a bank, end user 110 is to carry out a financial transaction electronically at the bank and the bank needs to verify the location of end user 110 prior to the financial transaction. In an example where digital service provider 130 is a governmental agency providing a service that end user 110 is only eligible in a certain region or territory, when end user 110 requests the service, the governmental agency verifies the location of end user 110. In an example where digital service provider 130 is a digital streaming service provider providing a service that end user 110 is only restricted in a certain region or territory, when end user 110 requests the service, the streaming service provider verifies the location of end user 110. In an example where digital service provider 130 is a social media service provider providing a service that end user 110 needs to be verified of region or territory from which end user 110 requests the service, the social media service provider verifies the location of end user 110.

A mobile device of end user 110 uses a mobile network provided by communication service provider 120. For example, the mobile device may be a simple mobile phone handset capable of text messaging or a smart phone. End user 110 may use another network other than the mobile network provided by the communication service provider to receive the service provided by digital service provider 130.

In order to use a location of end user 110 as an additional security factor for online services, the initial registration of a geofence and identifiers (IDs) of one or more cells (e.g., cells A, B, and C) covering the geofence is needed. The geofence is a geographical boundary within which a service provided the digital service provider is permissible or allowed. When end user 110 uses the mobile device within the geofence, the mobile device communicates with the one or more cells covering the geofence. From time to time, end user 110 may update the existing geofence with a new geofence and in turn IDs of one or more cells covering the new geofence will be updated.

In step 140 shown in FIG. 1, with digital service provider 130, end user 110 registers or updates a geofence in which a digital service is permissible or allowed. In other embodiments, digital service provider 130, in alternative step 140, registers or updates a geofence in which a digital service is permissible or allowed according to the terms and conditions of the service agreed with end user 110. In yet other embodiment, digital service provider 130, in alternative step 140, registers or updates a geofence in which a digital service is permissible or allowed according to a rule, a legislation, or a regulation applicable to end user 110. The digital service is provided by digital service provider 130. Upon receiving the registration or update from end user 110 or upon updating/updating the geofence by digital service provider 130, in step 150, digital service provider 130 sends a request to communication service provider 120; digital service provider 130 queries for a list of IDs of one or more cells covering the geofence. Upon receiving the request form digital service provider 130, in step 160, communication service provider 120 sends a response to the request form digital service provider 130; communication service provider 120 responds with the list of the IDs of the one or more cells covering the geofence. Upon receiving the list of the IDs from communication service provider 120, in step 170, digital service provider 130 stores the IDs of the one or more cells covering the geofence; digital service provider 130 registers/updates the IDs of the one or more cells (e.g., cells A, B, and C) in a user profile of end user 110.

Figure 2A:
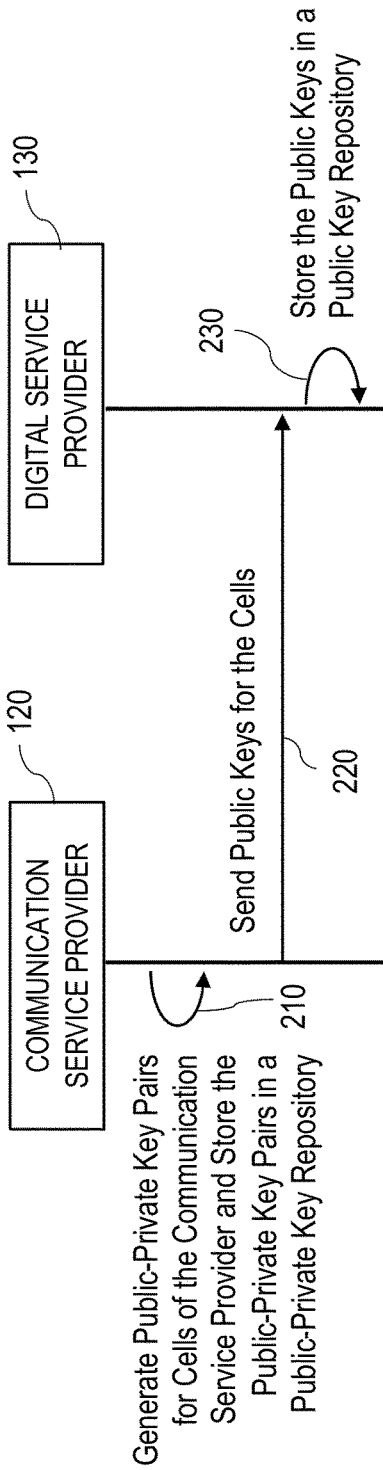
FIG. 2(A) shows a background communication process for using a user location as an additional security factor for online services, in accordance with one embodiment of the present invention.

FIG. 2(A) shows a background communication process for using a user location as an additional security factor for online services, in accordance with one embodiment of the present invention. The background communication process happens in background independent of any action of end user 110.

The mobile network of communication service provider 120 has cells (e.g., cells A, B, C, . . . , and Z) for a plurality of geofences. In step 210 shown in FIG. 2, communication service provider 120 generates public-private key pairs for all cells (e.g., cells A, B, C, . . . , and Z) in the mobile network of communication service provider 120. Therefore, each cell in the network has a unique public-private key pair. In step 220, communication service provider 120 sends public keys for the cells in the network to digital service provider 130. Upon receiving the public keys for the cells in the network, in step 230, digital service provider 130 stores the public keys in a public key repository of digital service provider 130. During an authentication process of end user 110, from the public key repository, digital service provider 130 will retrieve public keys for the one or more cells (as registered or updated in step 170, e.g., cells A, B, and C) covering the geofence of end user 110.

Figure 2B:
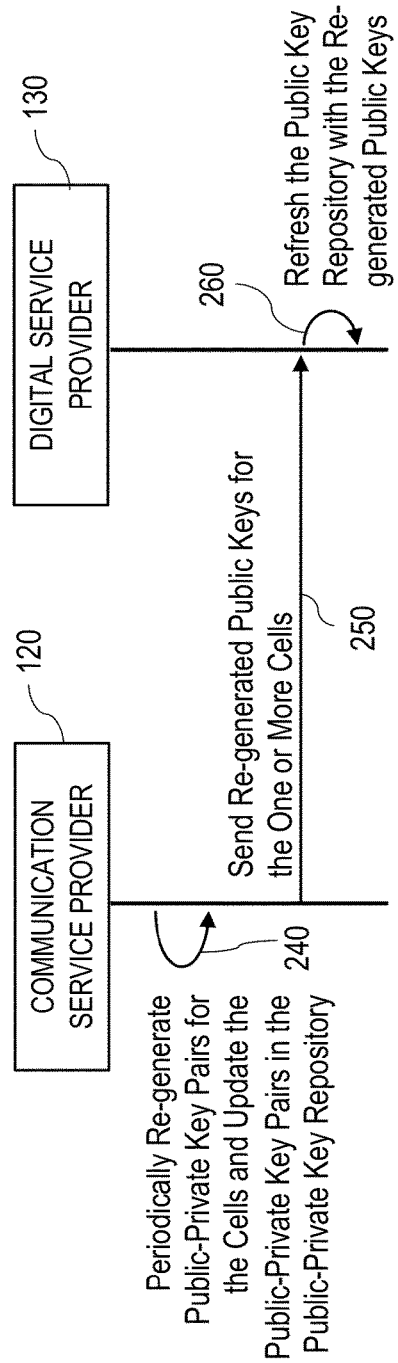
FIG. 2(B) shows an optional background communication process for using a user location as an additional security factor for online services, in accordance with one embodiment of the present invention.

FIG. 2(B) shows an optional background communication process for using a user location as an additional security factor for online services, in accordance with one embodiment of the present invention. The optional background communication process happens periodically (or in a predetermined time interval) in background independent of any action of end user 110.

In step 240 shown in FIG. 2(B), communication service provider 120 periodically re-generates public-private key pairs for all the cells (e.g., cells A, B, C, . . . , and Z) in the network of communication service provider 120. In step 250, communication service provider 120 sends re-generated public keys for the cells in the network to digital service provider 130. Upon receiving the re-generated public keys for the cells in the network, in step 260, digital service provider 130 refreshes the public key repository with the re-generated public keys.

Figure 3:
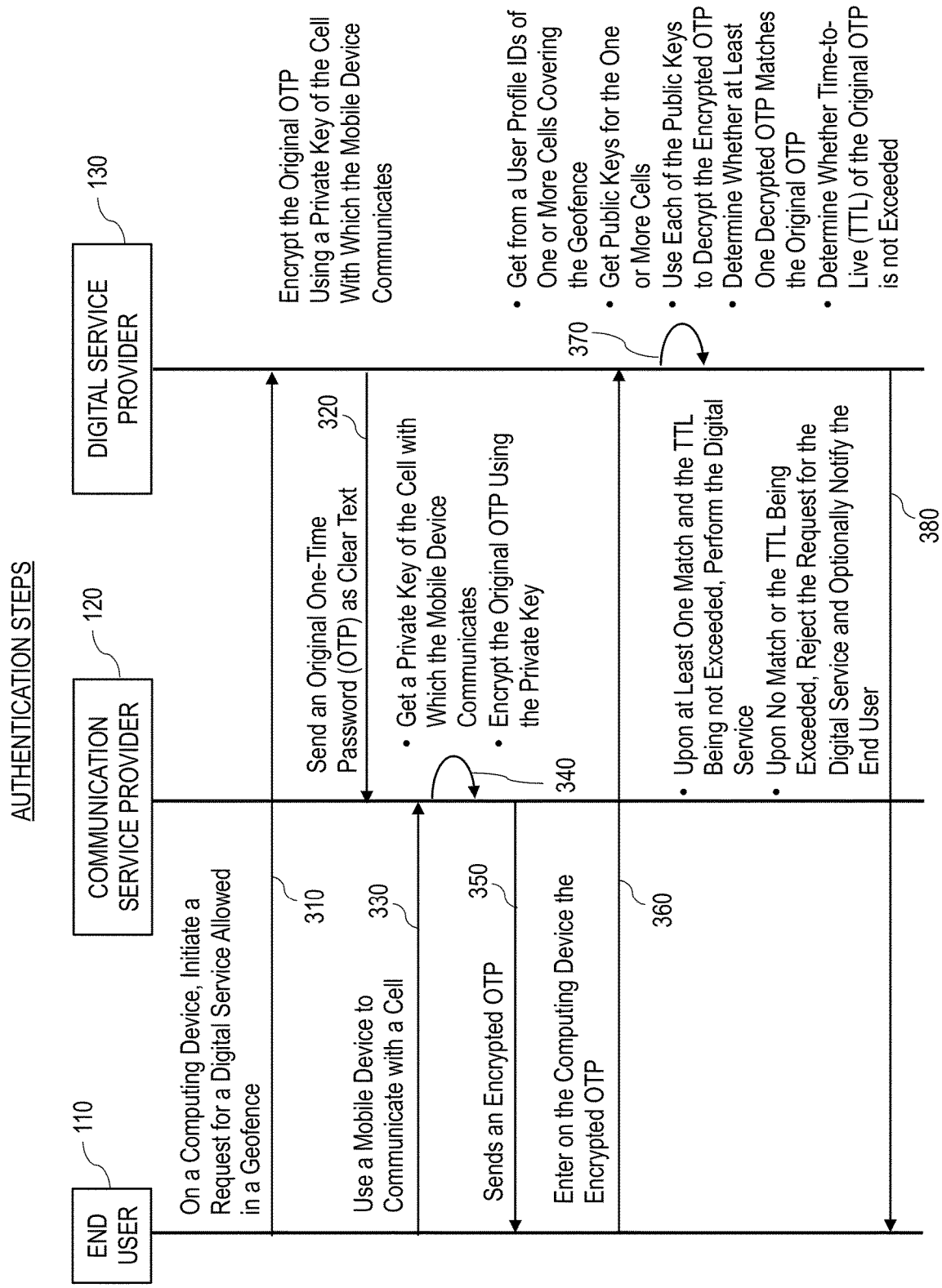
FIG. 3 shows an authentication process for using a user location as an additional security factor for online services, in accordance with one embodiment of the present invention.

FIG. 3 shows an authentication process for using a user location as an additional security factor for online services, in accordance with one embodiment of the present invention. In step 310 shown in FIG. 3, on a computing device, end user 110 initiates a request for a digital service which is provided by digital service provider 130 and is only allowed in a geofence. The computer device may be a desktop computer, a laptop, or any other electronic device or computing system communicating with other computing devices or computer systems including digital service provider 130. For example, a financial transaction at a bank is the digital service initiated by end user 110. Upon receiving the request for the digital service, in step 320, digital service provider 130 sends an original one-time password (OTP) to communication service provider 120. The original OTP is clear text, such as 134896. In step 330, end user 110 use a mobile device (e.g., a mobile phone) to communicate with a cell (e.g., cell A) in the mobile network of communication service provider 120.

In step 340 shown in FIG. 3, communication service provider 120 encrypts the original OTP using a private key for the cell (e.g., cell A) with which the mobile device communicates. In this step, an encrypted OTP is generated by communication service provider 120. Then, in step 350, communication service provider 120 sends the encrypted OTP to the mobile device of end user 110. Upon receiving the encrypted OTP, in step 360, end user 110 enters the encrypted OTP on the computing device (which has been used by end user in step 110 to initiate the request for the digital service).

Upon receiving the encrypted OTP input by end user 110, digital service provider 130 executes step 370 shown in FIG. 3. Step 370 includes multiple tasks as follows. Digital service provider 130 gets, from the user profile, the IDs of the one or more cells (e.g., cells A, B, and C) covering the geofence only in which the digital service is allowed or permissible. Digital service provider 130 gets, from a public key repository, public keys for the one or more cells (e.g., cells A, B, and C) covering the geofence. Digital service provider 130 uses each of the public keys for the one or more cells (e.g., cells A, B, and C) to decrypts the encrypted OTP. Iteratively decrypting the encrypted OTP with one or more public keys for the one or more cells (e.g., cells A, B, and C), digital service provider 130 obtains one or more decrypted OTPs. Digital service provider 130 compares the one or more decrypted OTP with the original OTP and determines whether at least one decrypted OTP matches the original OTP. Optionally, digital service provider 130 further determines whether time-to-live (TTL) of the original OTP is not exceeded. Determining whether the TTL is not exceeded provides an additional layer of security.

In step 380 shown in FIG. 3, digital service provider 130 grants or rejects the request for the digital service. Upon determining that at least one decrypted OTP matches the original OTP and the time-to-live (TTL) is not exceeded, digital service provider 130 performs the digital service for end user 110; for example, the bank allows the transaction to be executed. Upon determining that no decrypted OTP matches the original OTP or the time-to-live (TTL) is exceeded, digital service provider 130 refuses the request for the digital service and optionally notifies end user 110 of the refusal.

Figure 4:
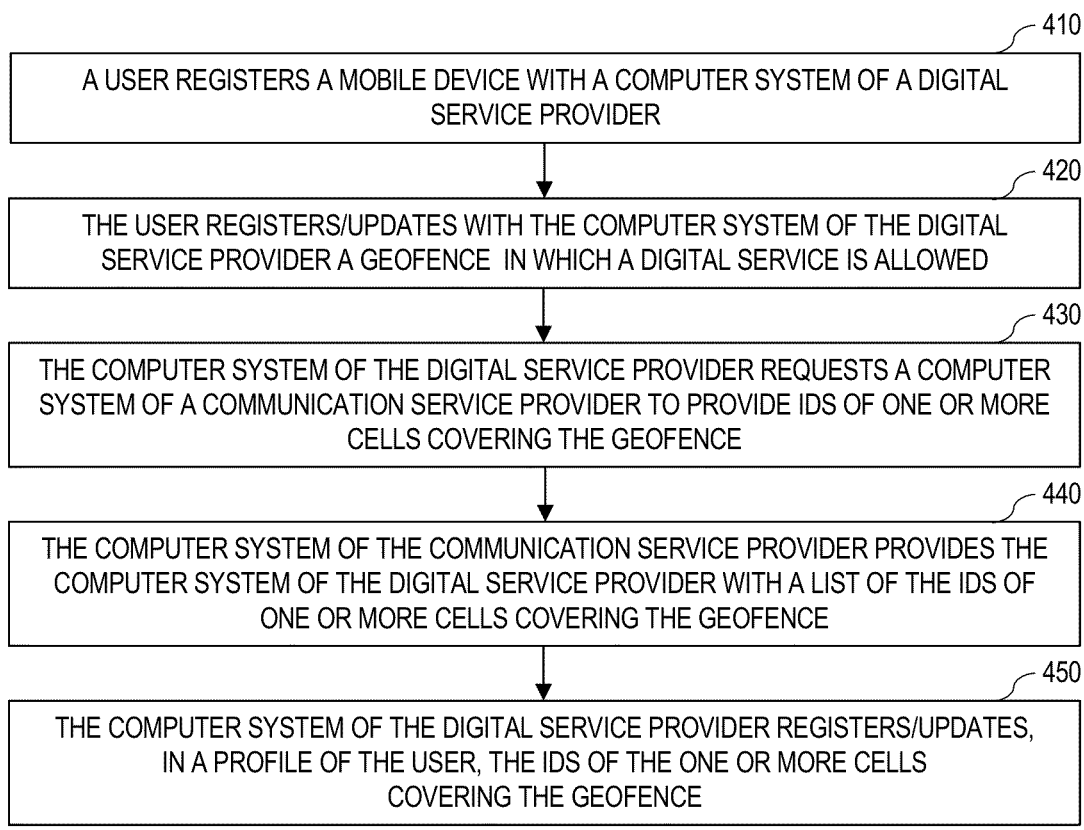
FIG. 4 is a flowchart showing operational steps of a registration/update process for using a user location as an additional security factor for online services, in accordance with one embodiment of the present invention.
Figure 6:
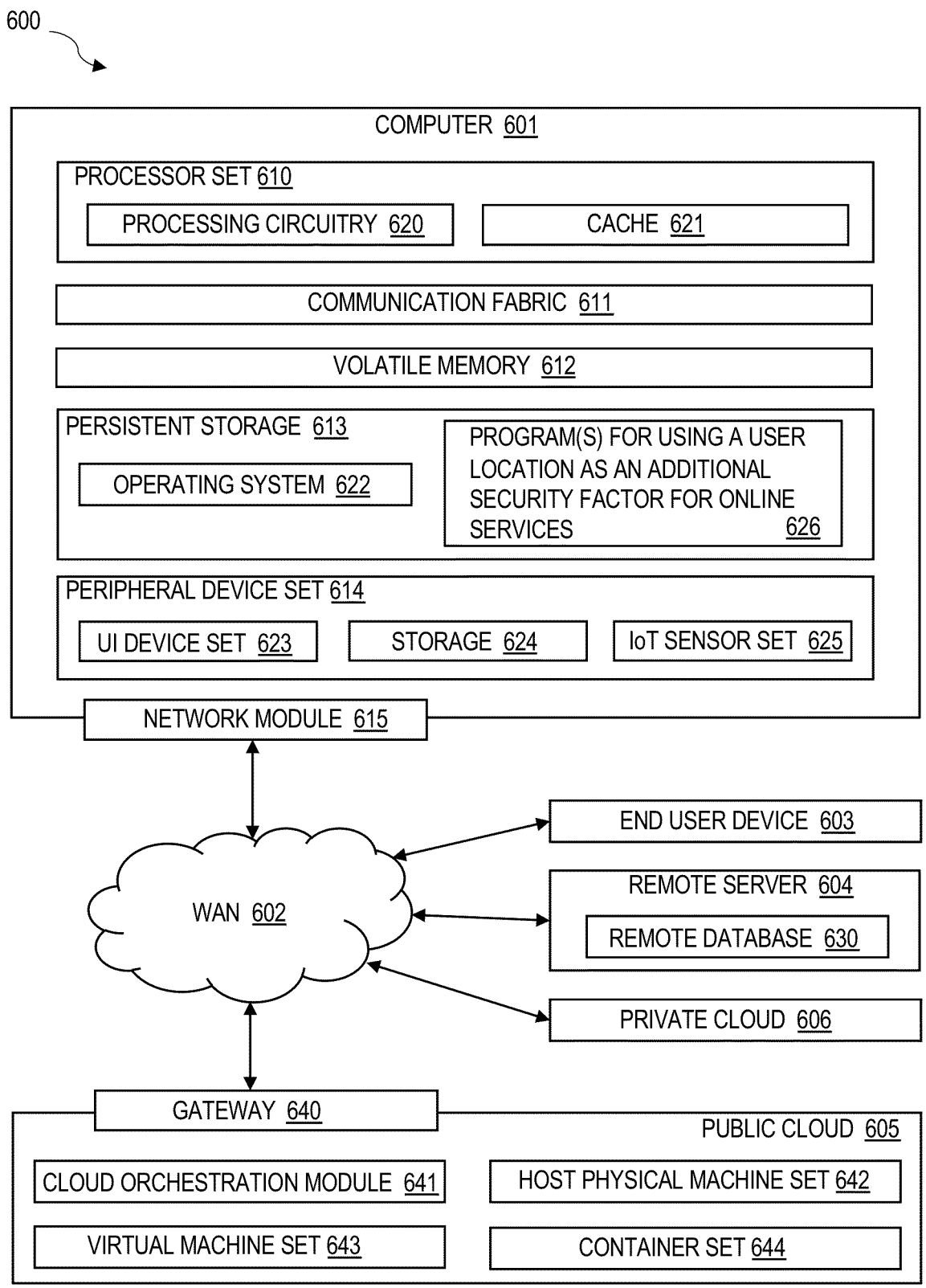
FIG. 6 is a systematic diagram illustrating an example of an environment for the execution of at least some of the computer code for using a user location as an additional security factor for online services, in accordance with one embodiment of the present invention.

FIG. 4 is a flowchart showing operational steps of a registration/update process for using a user location as an additional security factor for online services, in accordance with one embodiment of the present invention. The operational steps shown in FIG. 4 involve a computer system or server of a communication service provider and a computer system or server of a digital service provider. Computer 601 shown in FIG. 6 is a typical computer system or server.

Referring to FIG. 4, in step 410, a user registers a mobile device with a computer system of a digital service provider. The digital service provider (e.g., a bank, a digital streaming service provider, a social media service provider, or a governmental agency) provides a digital service to the user. To use a user location as an additional security factor for online services, the mobile device is needed to be registered with the digital service provider. For example, the mobile device may be a mobile phone, and the user registers the mobile phone number. The information such as mobile phone number and a permanent address of the user is stored by the computer system or server of the digital service provider as part of a profile of the user.

Referring to FIG. 4, in step 420, the user registers/updates with the computer system of the digital service provider a geofence in which a digital service provided by the digital service provider is allowed or permitted. The user registers the geofence when the user initially starts to use a user location as an additional security factor for online services. Whenever the geofence needs to be changed or re-defined, the user updates the geofence. The geofence is a geographical boundary within which the digital service is allowed or permissible. For example, the user wants to secure a bank account by telling the bank as the digital service provider that financial transactions should only be performed when the request originates from a given geo-location or zone. In some embodiments, the digital service may not be limited to a single geofence; multiple geofences may be defined as permissible for the digital service. In some other embodiments, some geofences may be refined by adding time-sliced information; for example, one geofence is associated with a work location during weekdays and another geofence is associated with a home address.

In some embodiments, in alternative step 420, the computer system of the digital service provider registers or updates the geofence in which the digital service is permissible or allowed according to the terms and conditions of the digital service agreed with the user. In yet other embodiment, in step 420, the computer system of the digital service provider registers or updates the geofence in which the digital service is permissible or allowed according to a rule, a legislation, or a regulation applicable to the user.

Referring to FIG. 4, upon receiving the registration of the mobile device and the registration or update of the geofence, in step 430, the computer system of the digital service provider requests a computer system of a communication service provider to provide identifiers (IDs) of one or more cells covering the geofence. As a subscriber of the communication service provider, the mobile device of the user uses a mobile network of the communication service provider. The registered geofence includes the one or more cells (e.g., cells A, B, and C), and the computer system of the communication service provider has an inventory of the one or more cells (e.g., cells A, B, and C) covering the registered geofence.

Referring to FIG. 4, upon receiving the request from the computer system of the digital service provider, in step 440, the computer system of the communication service provider provides the computer system of the digital service provider with a list of the IDs of one or more cells covering the registered geofence.

Referring to FIG. 4, upon receiving the list of the IDs of one or more cells from the computer system of the communication service provider, in step 450, the computer system of the digital service provider registers/updates, in the profile of the user, the IDs of the one or more cells covering the geofence. In an authentication process for using a user location as an additional security factor for online services, the computer system of the digital service provider will retrieve from the profile of the user the IDs of the one or more cells covering the registered geofence.

Figure 5A:
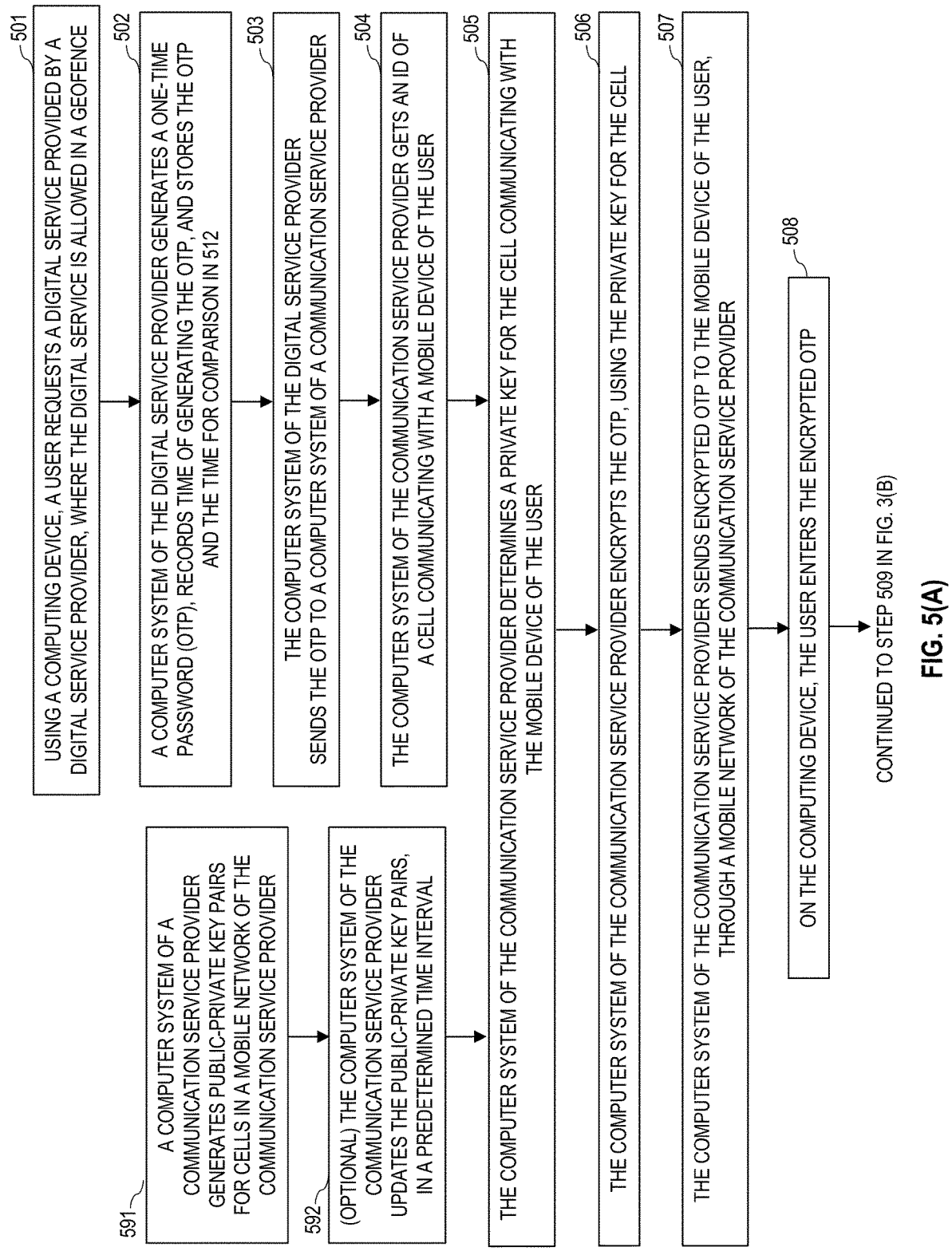
FIG. 5(A) and FIG. 5(B) present a flowchart showing operational steps of a background communication process and an authentication process for using a user location as an additional security factor for online services, in accordance with one embodiment of the present invention.
Figure 5B:
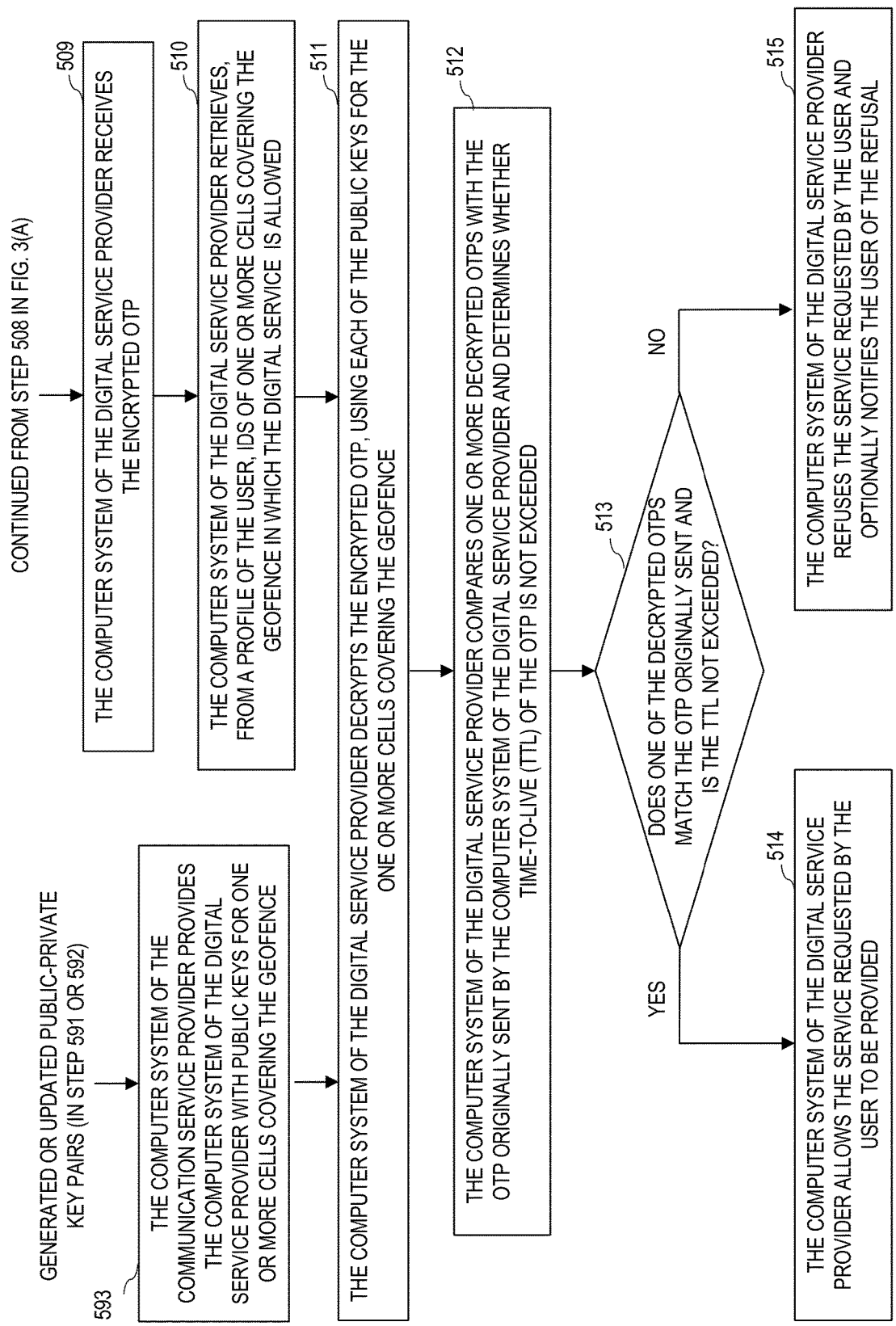

FIG. 5(A) and FIG. 5(B) present a flowchart showing operational steps of a background communication process and an authentication process for using a user location as an additional security factor for online services, in accordance with one embodiment of the present invention. The operational steps shown in FIG. 5(A) and FIG. 5(B) are implemented by a computer system or server of a communication service provider and a computer system or server of a digital service provider. Computer 601 shown in FIG. 6 is a typical computer system or server.

Referring to FIG. 5(A), in step 501, using a computing device, a user requests a digital service provided by a digital service provider. The digital service is allowed or permitted only in a geofence. Whether the digital service is to be provided in the geofence will be verified in the rest steps shown in FIG. 5(A) and FIG. 5(B). The computing device of the user may be a desktop computer, a laptop, or any other electronic device or computing system communicating with other computing devices or computer systems including the digital service provider. The computing device is used to receive or perform the digital service, and it does not have to be registered with the digital service provider.

In an example, the digital service provider is a bank, and the user requests to carry out a financial transaction electronically that only can be processed in a certain location of the user. In another example, the digital service provider is a governmental agency providing a service that the user is only eligible in a certain region or territory. In yet another example, the digital service provider is a social media service provider, and a social media service needs verification of the user location in a certain tax jurisdiction. In yet another example, the digital service provider is a streaming service provider, and a streaming service is provided to the user in a certain region or territory.

Referring to FIG. 5(A), upon receiving the request for the digital service, in step 502, a computer system of the digital service provider generates a one-time password (OTP), records time of generating the OTP, and stores the OTP and the time for comparison in step 512. This original OTP and the time of generating this original OTP may be stored in a user profile in the computer system of the digital service provider. The original OTP is in a format of clear text (e.g., 134896). The time of generating the OTP may be used to compare with the time-to-live (TTL) of the OTP, which is the maximum elapsed time allowed from the OTP generating time to the time the computer system of the digital service provider receives the OTP or encrypted OTP back from the user, to increase level of security.

Referring to FIG. 5(A), in step 503, the computer system of the digital service provider sends the OTP (generated in step 502) to a computer system of a communication service provider. A mobile device of the user is a subscriber of the communication service provider and uses a mobile network of the communication service provider; therefore, the OTP is sent to the computer system of the communication service provider.

Referring to FIG. 5(A), upon receiving the OTP from the computer system of the digital service provider, in step 504, the computer system of the communication service provider gets an identifier (ID) of a cell communicating with the mobile device of the user. The computer system of the communication service provider determines that the mobile device of the user is communicating with the cell and knows the ID of the cell with which a mobile device of the user is communicating, but the computer system of the digital service provider does not know this ID.

Referring to FIG. 5(A), upon receiving the OTP and obtaining the ID of the cell with which the mobile device of the user communicates, in step 505, the computer system of the communication service provider determines a private key for the cell communicating with the mobile device of the user. In the mobile network of the communication service provider, each cell has a unique public-private key pair. The computer system of the communication service provider determines the private key from public-private key pairs for respective ones of the cells in the mobile network. Private keys and public-private key pairs are stored in a repository in the computer system of the communication service provider. The private keys do not leave the computer system of the communication service provider. The generation and the optional update of the public-private key pairs are steps 591 and 592.

Referring to FIG. 5(A), in step 591, the computer system of the communication service provider generates public-private key pairs for cells in the mobile network of the communication service provider. Optionally, in step 592, the computer system of the communication service provider updates or re-generates the public-private key pairs, in a predetermined time interval. The public-private key pair of each cell is regularly changed and updated or re-generated public keys for all the cells are accordingly made available by the communication service provider to the digital service provider. The generated and updated the public-private key pairs are stored in the repository in the computer system of the communication service system. The unique public-private key pair per cell limits the attack surfaces involving "cloning" of a cell site, e.g., by setting up a fake "proxy" cell. The optional time-limited validity of public-private key pair controlled by the regular public-private key pair regeneration further hardens the security by limiting time duration in which a stolen private key or a private key obtained through some reverse computation may be used by a cyber security attacker.

Referring to FIG. 5(A), upon the private key for the cell communicating with the mobile device being determined in step 505, the computer system of the communication service provider, in step 506, encrypts the OTP, using the private key for the cell communicating with the mobile device of the user. The length of encrypted OTP depends on the encryption algorithm. In step 507, the computer system of the communication service provider sends encrypted OTP to the mobile device of the user, through the mobile network of the communication service provider.

Referring to FIG. 5(A), upon receiving the encrypted OTP from the computer system of the communication service provider, in step 508, using the computing device (which is used to request the digital service in step 501), the user enters the encrypted OTP. The conversion of the encrypted OTP to an alphanumeric value for example may be performed for the user's convenience in entering the encrypted OTP. If a smart phone is used, the encrypted OTP can be displayed as a QR code which can greatly facilitate entry by the user to the computing device where the digital service (e.g., a transaction) is carried out (assuming the computing device has QR scanning capability).

Referring to FIG. 5(B), in step 509, the computer system of the digital service provider receives the encrypted OTP, from the computing device of the user. Upon receiving the encrypted OTP, in step 510, the computer system of the digital service provider retrieves, from the profile of the user, IDs of the one or more cells (e.g., cells A, B, and C) covering the geofence in which the digital service is allowed. The IDs of the one or more cells are stored in the profile of the user in step 450, as described in a previous paragraph with reference to FIG. 4 in this document. In step 511, the computer system of the digital service provider decrypts the encrypted OTP, using each of the public keys for the one or more cells covering the geofence. The computer system of the digital service provider retrieves the public keys for the one or more cells covering the geofence, from the repository in the computer system of the digital service provider. Through the decryption of the encrypted OTP using one or more public keys, the computer system of the digital service provider obtains one or more decrypted OTPs. It is necessary to decrypt using multiple cell's public keys as there may be multiple cells (e.g., cells A, B, and C) covering the registered geofence. Using multiple cell's public keys, the computer system of the digital service provider obtains multiple decrypted OTPs.

The public keys for the one or more cells used in step 511 are provided by the computer system of the communication service provider. The generated (in step 591) or updated (in step 592) public-private key pairs make the public keys for the one or more cells covering the geofence available. Referring to FIG. 5(B), in step 593, the computer system of the communication service provider provides the computer system of the digital service provider with the public keys for one or more cells covering the geofence.

Referring to FIG. 5(B), upon obtaining the one or more decrypted OTPs in step 511, in step 512, the computer system of the digital service provider compares the one or more decrypted OTPs with the OTP originally sent by the computer system of the digital service provider and optionally determines whether time-to-live (TTL) of the OTP is not exceeded. The TTL being not exceeded is an optional condition for the purpose of adding an additional layer of security.

In response to determining one of the decrypted OTPs match the OTP originally sent and the TTL is not exceeded (YES branch of decision block 513), in step 514, the computer system of the digital service provider allows the digital service requested by the user in step 501 to be provided. For example, the computer system of the bank performs the transaction the user has requested.

In response to determining one of the decrypted OTPs does not match the OTP originally sent or the TTL is exceeded (NO branch of decision block 513), in step 515, the computer system of the digital service provider refuses the digital service requested by the user in step 501. Optionally, the computer system of the digital service provider notifies the user of the refusal. For example, the computer system of the bank does not perform the transaction request initiated by the user and optionally sends a notification of refusal to the transaction.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In FIG. 6, computing environment 600 contains an example of an environment for the execution of at least some of the computer code involved in performing the inventive methods, such as program(s) 626 for using a user location as an additional security factor for online services. In addition to block 626, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 626, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 626 in persistent storage 613.

Communication fabric 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 626 typically includes at least some of the computer code involved in performing the inventive methods.

Peripheral device set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

What is claimed is:

1. A computer-implemented method for using a user location as a security factor for online services, the method comprising:
   receiving from a computing device of a user, by a first computer hosting a digital service provider, a request for a digital service allowed in a geofence;
   generating, by the first computer, an original one-time password for the digital service;
   sending to a second computer hosting a communication service provider, by the first computer, the original one-time password, wherein the second computer encrypts the original one-time password using a private key of a public-private key pair for a cell in a mobile network of the communication service provider and the cell is communicating with a mobile device of the user, and wherein the second computer sends an encrypted one-time password to the mobile device;
   receiving, by the first computer, the encrypted one-time password entered by the user on the computing device of the user;
   decrypting, by the first computer, the encrypted one-time password to obtain one or more decrypted one-time passwords, using respective public keys of public-private key pairs for one or more cells covering the geofence;
   determining, by the first computer, whether at least one of the one or more decrypted one-time passwords matches the original one-time password; and
   in response to determining the at least one of the one or more decrypted one-time passwords matching the original one-time password, allowing, by the first computer, the digital service to be provided.

2. The computer-implemented method of claim 1, further comprising:
   in response to determining the at least one of the one or more decrypted one-time passwords not matching the original one-time password, refusing, by the first computer, the request for the digital service.

3. The computer-implemented method of claim 1, further comprising:
   determining, by the first computer, whether time-to-live of the original one-time password is not exceeded;
   in response to determining the at least one of the one or more decrypted one-time passwords matching the original one-time password and the time-to-live of the original one-time password is not exceeded, allowing, by the first computer, the digital service to be provided; and
   in response to determining the at least one of the one or more decrypted one-time passwords not matching the original one-time password or the time-to-live of the original one-time password is exceeded, refusing, by the first computer, the request for the digital service.

4. The computer-implemented method of claim 1, further comprising:
   registering, by the first computer, the mobile device;
   registering or updating, by the first computer, the geofence in which the digital service is allowed;
   requesting the second computer, by the first computer, to provide identifiers of the one or more cells covering the geofence; and
   upon receiving from the second computer the identifiers of the one or more cells covering the geofence, storing, by the first computer, the identifiers of the one or more cells in a profile of the user.

5. The computer-implemented method of claim 1, further comprising:
   generating, by the second computer, the public-private key pairs for cells in the mobile network of the communication service provider;
   sending to the first computer, by the second computer, the respective public keys for the one or more cells covering the geofence; and
   storing in a public key repository on the first computer, by the first computer, the respective public keys.

6. The computer-implemented method of claim 5, further comprising:

re-generating, by the second computer, the public-private key pairs for the cells in the mobile network, in a predetermined time interval;

sending to the first computer, by the second computer, re-generated public keys for the one or more cells covering the geofence; and refreshing, by the first computer, the public key repository with the re-generated public keys.

7. The computer-implemented method of claim 1, further comprising:

getting, by the second computer, an identifier of the cell that is communicating with the mobile device of the user;

determining, by the second computer, the private key for the cell; and encrypting, by the second computer, the original one-time password using the private key; and sending to the mobile device of the user, by the second computer, the encrypted one-time password, through the mobile network of the communication service provider.

8. A computer program product for using a user location as a security factor for online services, the computer program product comprising a computer readable storage medium having program instructions stored therewith, the program instructions executable by one or more processors, the program instructions executable to:

receive from a computing device of a user, by a first computer hosting a digital service provider, a request for a digital service allowed in a geofence;

generate, by the first computer, an original one-time password for the digital service;

send to a second computer hosting a communication service provider, by the first computer, the original one-time password, wherein the second computer encrypts the original one-time password using a private key of a public-private key pair for a cell in a mobile network of the communication service provider and the cell is communicating with a mobile device of the user, and wherein the second computer sends an encrypted one-time password to the mobile device;

receive, by the first computer, the encrypted one-time password entered by the user on the computing device of the user;

decrypt, by the first computer, the encrypted one-time password to obtain one or more decrypted one-time passwords, using respective public keys of public-private key pairs for one or more cells covering the geofence;

determine, by the first computer, whether at least one of the one or more decrypted one-time passwords matches the original one-time password; and in response to determining the at least one of the one or more decrypted one-time passwords matching the original one-time password, allow, by the first computer, the digital service to be provided.

9. The computer program product of claim 8, further comprising the program instructions executable to:

in response to determining the at least one of the one or more decrypted one-time passwords not matching the original one-time password, refuse, by the first computer, the request for the digital service.

10. The computer program product of claim 8, further comprising the program instructions executable to:

determine, by the first computer, whether time-to-live of the original one-time password is not exceeded;

in response to determining the at least one of the one or more decrypted one-time passwords matching the original one-time password and the time-to-live of the original one-time password is not exceeded, allow, by the first computer, the digital service to be provided; and in response to determining the at least one of the one or more decrypted one-time passwords not matching the original one-time password or the time-to-live of the original one-time password is exceeded, refuse, by the first computer, the request for the digital service.

11. The computer program product of claim 8, further comprising the program instructions executable to:

register, by the first computer, the mobile device;

register or update, by the first computer, the geofence in which the digital service is allowed;

request the second computer, by the first computer, to provide identifiers of the one or more cells covering the geofence; and upon receiving from the second computer the identifiers of the one or more cells covering the geofence, store, by the first computer, the identifiers of the one or more cells in a profile of the user.

12. The computer program product of claim 8, further comprising the program instructions executable to:

generate, by the second computer, the public-private key pairs for cells in the mobile network of the communication service provider;

send to the first computer, by the second computer, the respective public keys for the one or more cells covering the geofence; and store in a public key repository on the first computer, by the first computer, the respective public keys.

13. The computer program product of claim 12, further comprising program instructions executable to:

re-generate, by the second computer, the public-private key pairs for the cells in the mobile network, in a predetermined time interval;

send to the first computer, by the second computer, re-generated public keys for the one or more cells covering the geofence; and refresh, by the first computer, the public key repository with the re-generated public keys.

14. The computer program product of claim 8, further comprising the program instructions executable to:

get, by the second computer, an identifier of the cell that is communicating with the mobile device of the user;

determine, by the second computer, the private key for the cell; and encrypt, by the second computer, the original one-time password using the private key; and send to the mobile device of the user, by the second computer, the encrypted one-time password, through the mobile network of the communication service provider.

15. A computer system for using a user location as a security factor for online services, the computer system comprising one or more processors, one or more computer readable tangible storage devices, and program instructions stored on at least one of the one or more computer readable tangible storage devices for execution by at least one of the one or more processors, the program instructions executable to:

receive from a computing device of a user, by a first computer hosting a digital service provider, a request for a digital service allowed in a geofence;

generate, by the first computer, an original one-time password for the digital service;

send to a second computer hosting a communication service provider, by the first computer, the original one-time password, wherein the second computer encrypts the original one-time password using a private key of a public-private key pair for a cell in a mobile network of the communication service provider and the cell is communicating with a mobile device of the user, and wherein the second computer sends an encrypted one-time password to the mobile device;

receive, by the first computer, the encrypted one-time password entered by the user on the computing device of the user;

decrypt, by the first computer, the encrypted one-time password to obtain one or more decrypted one-time passwords, using respective public keys of public-private key pairs for one or more cells covering the geofence;

determine, by the first computer, whether at least one of the one or more decrypted one-time passwords matches the original one-time password; and in response to determining the at least one of the one or more decrypted one-time passwords matching the original one-time password, allow, by the first computer, the digital service to be provided.

16. The computer system of claim 15, further comprising the program instruction executable to:

in response to determining the at least one of the one or more decrypted one-time passwords not matching the original one-time password, refuse, by the first computer, the request for the digital service.

17. The computer system of claim 15, further comprising the program instructions executable to:

register, by the first computer, the mobile device;

register or update, by the first computer, the geofence in which the digital service is allowed;

request the second computer, by the first computer, to provide identifiers of the one or more cells covering the geofence; and upon receiving from the second computer the identifiers of the one or more cells covering the geofence, store, by the first computer, the identifiers of the one or more cells in a profile of the user.

18. The computer system of claim 15, further comprising program instructions executable to:

generate, by the second computer, the public-private key pairs for cells in the mobile network of the communication service provider;

send to the first computer, by the second computer, the respective public keys for the one or more cells covering the geofence; and store in a public key repository on the first computer, by the first computer, the respective public keys.

19. The computer system of claim 18, further comprising program instructions executable to:

re-generate, by the second computer, the public-private key pairs for the cells in the mobile network, in a predetermined time interval;

send to the first computer, by the second computer, re-generated public keys for the one or more cells covering the geofence; and refresh, by the first computer, the public key repository with the re-generated public keys.

20. The computer system of claim 15, further comprising program instructions executable to:

get, by the second computer, an identifier of the cell that is communicating with the mobile device of the user;

determine, by the second computer, the private key for the cell; and encrypt, by the second computer, the original one-time password using the private key; and send to the mobile device of the user, by the second computer, the encrypted one-time password, through the mobile network of the communication service provider.

\* \* \* \* \*